(12) United States Patent
Krikheli et al.

(10) Patent No.: US 8,121,893 B1
(45) Date of Patent: Feb. 21, 2012

(54) CUSTOMIZING ADVERTISEMENT PRESENTATIONS

(75) Inventors: Jerry P. Krikheli, West Hills, CA (US); Jennifer Sager, Santa Monica, CA (US); Nathan Lucash, Santa Monica, CA (US); Loren Donelson, Los Angeles, CA (US); Shannon P. Bauman, San Francisco, CA (US); Kevan Newton, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 775 days.

(21) Appl. No.: 12/108,237

(22) Filed: Apr. 23, 2008

Related U.S. Application Data

(60) Provisional application No. 60/953,113, filed on Jul. 31, 2007.

(51) Int. Cl.
*G06Q 30/00* (2006.01)

(52) U.S. Cl. .................... 705/14.1; 705/14.73; 705/14.4

(58) Field of Classification Search ................ 705/14
See application file for complete search history.

(56) References Cited

U.S. PATENT DOCUMENTS

| | | | |
|---|---|---|---|
| 2004/0260767 A1* | 12/2004 | Kedem et al. | 709/203 |
| 2009/0070221 A1* | 3/2009 | Carmichael et al. | 705/14 |

\* cited by examiner

*Primary Examiner* — Thomas M Hammond, III
(74) *Attorney, Agent, or Firm* — Fish & Richardson P.C.

(57) ABSTRACT

Customization settings are received from a content publisher. The customization settings control a manner in which information is displayed to users. A request for an advertisement presentation to be displayed with content associated with the content publisher is received. The requested advertisement presentation is rendered in a content-related site hosted by the content publisher. In response to receiving a user selection of the advertisement presentation, a customized advertisement presentation is rendered in an advertisement-related site hosted by the content publisher based on the user selection and the customization settings.

16 Claims, 8 Drawing Sheets

CUSTOMIZING ADVERTISEMENT PRESENTATIONS

CROSS-REFERENCE TO RELATED APPLICATION

This application claims priority to U.S. Provisional Patent Application Ser. No. 60/953,113 filed Jul. 31, 2007, and entitled "CUSTOMIZING ADVERTISEMENT PRESENTATIONS," the contents of which are incorporated herein by reference.

BACKGROUND

Advertising through interactive media is gaining popularity, with the Internet in particular becoming a powerful advertising medium. Internet users often search the Internet for products and services, and advertisers frequently use the Internet to target audiences interested in available products and services.

Some forms of interactive media advertising involve targeting and distributing advertisements ("ads") to users based on content associated with online publishers (e.g., an online newspaper). For example, advertisements for an automobile manufacturer can be presented with publisher content (e.g., a publisher's web page) or in advertisement-dedicated sites, in order to drive online customers to the manufacturer site. In some cases, the presentation of advertisements and advertisement-dedicated sites may clash with the look and feel of content publisher sites.

SUMMARY

In one general aspect, a computer-implemented method involves receiving customization settings from a content publisher. The customization settings control a manner in which information is displayed to users. The method involves receiving a request for an advertisement presentation to be displayed with content associated with the content publisher. The method involves rendering the requested advertisement presentation in a content-related site hosted by the content publisher. In response to receiving a user selection of the advertisement presentation, a customized advertisement presentation is rendered in an advertisement-related site hosted by the content publisher based on the user selection and the customization settings.

In another general aspect, a computer-implemented method involves receiving customization settings from a content publisher. The customization settings control a manner in which information is displayed to users. The method involves receiving a request for an advertisement presentation to be displayed with content associated with the content publisher. The method involves rendering the requested advertisement presentation in a first display element embedded in a content-related site hosted by the content publisher. In response to a user selection of the advertisement presentation, the user is directed to a second display element embedded in an advertisement-related site hosted by the content publisher. The method involves populating the second display element with at least one advertisement customized based on the received customization settings. The at least one customized advertisement relates to the user selection.

In another general aspect, a computer-implemented method involves receiving customization settings from a content publisher. The customization settings control a manner in which information is displayed to users. The method involves receiving a request for a selectable descriptor to be displayed with content associated with the content publisher. The selectable descriptor summarizes an aspect of the content and is associated with a navigation link. The method involves rendering the requested descriptor in a first inline frame embedded in a content-related site hosted by the content publisher. In response to a user selection of the descriptor in the first site, the user is directed to a second inline frame embedded in an advertisement-related site hosted by the content publisher. The method involves populating the second inline frame with at least one advertisement customized based on the received customization settings. The at least one customized advertisement relates to the selected descriptor.

In another general aspect, a system comprises means for receiving customization settings from a content publisher. The customization settings control a manner in which information is displayed to users. The system further comprises means for receiving a request for an advertisement presentation to be displayed with content associated with the content publisher. The system comprises means for rendering the requested advertisement presentation in a content-related site hosted by the content publisher. The system comprises means for, in response to receiving a user selection of the advertisement presentation, rendering a customized advertisement presentation in an advertisement-related site hosted by the content publisher based on the user selection and the customization settings.

In another general aspect, a system comprises an advertising management module. The advertising management module is configured to receive customization settings from a content publisher. The customization settings control a manner in which information is displayed to users. The advertising management module is configured to receive a request for an advertisement presentation to be displayed with content associated with the content publisher. The advertising management module is configured to render the requested advertisement presentation in a content-related site hosted by the content publisher. In response to receiving a user selection of the advertisement presentation, the advertising management module renders a customized advertisement presentation in an advertisement-related site hosted by the content publisher based on the user selection and the customization settings.

In another general aspect, a computer readable medium stores a computer program. The computer program includes instructions that, when executed, cause at least one processor to: receive customization settings from a content publisher, the customization settings controlling a manner in which information is displayed to users; receive a request for an advertisement presentation to be displayed with content associated with the content publisher; render the requested advertisement presentation in a content-related site hosted by the content publisher; and in response to receiving a user selection of the advertisement presentation, render a customized advertisement presentation in an advertisement-related site hosted by the content publisher based on the user selection and the customization settings.

The details of one or more implementations are set forth in the accompanying drawings and the description below. Other features and advantages will be apparent from the description and drawings as well as from the claims.

BRIEF DESCRIPTION OF THE DRAWINGS

The accompanying drawings show features of implementations consistent with this disclosure and, together with the corresponding description, help explain principles associated with the disclosure.

DESCRIPTION

The following description refers to the accompanying drawings, in which, in the absence of a contrary representation, the same numbers in different drawings represent similar elements.

In some implementations, publishers (e.g., Internet content publishers including online newspapers, television stations, radio stations, etc.) or their proxies can host and customize ad presentations. The publishers can customize the presentations of ads so that, for example, the look and feel of such presentations matches the look and feel of publisher sites. Publishers can thus protect brand equity and recognition while maximizing revenue.

In some implementations, an embeddable display element, such as an HTML (Hypertext Markup Language) I-Frame (inline frame), allows ad presentations to be displayed to users with publisher content. The embeddable display element may be provided by an ad serving system that targets ads to publisher content. The embeddable display element may be displayed in a publisher webpage and allow the ad serving system to display ad presentations with publisher content in the publisher page. The displayed ad presentations can include one or more online ads and/or one or more topical descriptors. The topical descriptors can include words, phrases or other representations that summarize all or a portion of the publisher content and topical variations related to the content. For example, the embeddable display element may display an "Auto Tires" descriptor related to automobile content. The descriptors can be associated with or include navigation links (e.g., hyperlinks) that direct users to other locations.

A selection of a particular descriptor may direct a user to a publisher-hosted webpage that contains a second embeddable display element. This second display element may contain additional ads related to the selected descriptor (e.g., additional ads related to automobile tires). The second display element can include ads and other information provided by the ad serving system and styled to match publisher-specified parameters and preferences (e.g., decorated with a publisher-specified color scheme).

Figure 1:
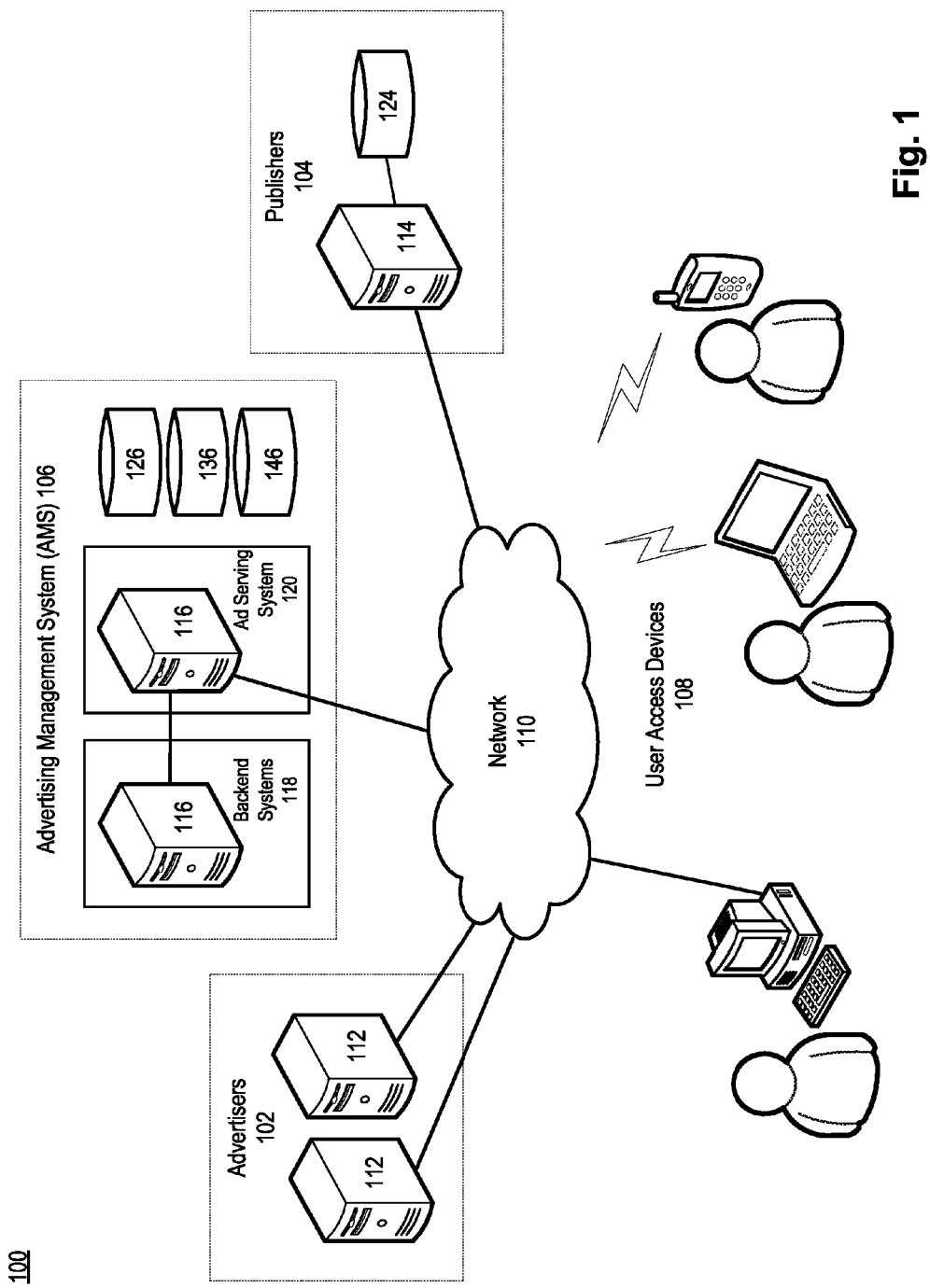
FIG. 1 is a block diagram depicting an example advertising environment.

With reference to FIG. 1, an example advertising environment 100 may include one or more advertisers 102, one or more publishers 104, an ad management system (AMS) 106, and one or more user access devices 108, which may be coupled to a network 110. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network.

While reference is made to distributing advertisements, the environment 100 can be suitable for distributing other forms of content including other forms of sponsored content The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to or include sponsored-content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads can also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable to a user. In some examples, an ad impression may occur when an ad is displayed on a display device of a user access device. An ad group refers, for example, to an entity that represents a group of creatives that share a common characteristic, such as having the same ad targeting criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain and/or track ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. The term "content" refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

In some implementations, the publishers 104 may include content providers with an Internet presence, such as online publication and news providers (e.g., online newspapers, online magazines, television websites, etc.), online service providers (e.g., financial service providers, health service providers, etc), and the like. The publishers 104 can include television broadcasters, radio broadcasters, satellite broadcasters, and other content providers.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with ads that are related or relevant to the retrieved content for display to users. As discussed further below, these relevant ads may be provided from the AMS 106 and be combined with content for display to users. In some examples, the publishers 104 may retrieve content for display on a particular user access device 108 and then forward the content to the user access device 108 along with code that causes one or more ads from the AMS 106 to be displayed to the user. In other examples, the publishers 104 may retrieve content, retrieve one or more relevant ads (e.g., from the AMS 106 or the advertisers 102), and then integrate the ads and the article to form a content page for display to the user.

In some implementations, one or more of the publishers 104 may represent a content network that is associated with the AMS 106. In such implementations, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or targeting of ads through the environment 100 to the user access devices 108. In some configurations, the AMS 106 may include or access functionality associated with the AdWords™ and AdSense™ systems provided by Google, Inc. (Mountain View, Calif.).

The AMS 106 may include one or more data processing systems 116, such as servers or embedded systems, coupled to the network 110. It can also include one or more processes, such as server processes. In some examples, the AMS 106 may include an ad serving system 120 and one or more backend systems 118. The ad serving system 120 may include one or more data processing systems 116 and may perform functionality associated with delivering ads to publishers or user access devices. The backend systems 118 may include one or more data processing systems 116 may perform functionality associated with identifying relevant ads to deliver, generating reports, maintaining accounts and usage information, and other backend system processing and maintenance. The AMS 106 can use the backend processing systems 118 and the ad serving system 120 to target ads from the advertisers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or front-end modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AFEs and PFEs may include or generate physical or virtual mechanisms by which a user (or system) can input information to the AMS 106 or other system and/or by which a user (or system) can perceive information generated by such systems. In some examples, the AFEs and PFEs may include or generate visual interfaces, such as graphical user interfaces (GUIs). Other types of interfaces can also be used. The interfaces can include one or more physical or virtual elements or widgets that allow a user (or system) to view, select and/or indicate information.

The AMS 106 provides various advertising management features to the advertisers 102. In some examples, the AMS 106 may include features for advertisers similar to those in the AdWords™ system provided by Google, Inc. The AMS 106 advertising features may allow users to set up user accounts, set account preferences, create ads, select keywords for ads, create campaigns or initiatives for multiple products or businesses, view reports associated with accounts, analyze costs and return on investment, target customers in different regions, target ads to particular publishers, track financial information, track ad performance, estimate ad traffic, access keyword tools, add graphics and animations to ads, etc.

The AMS 106 may allow the advertisers 102 to create ads and input keywords for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion can be defined to occur when a user clicks on an ad, is referred to the advertiser's web page, and consummates a purchase there before leaving that web page. In another example, a conversion can be defined as the display of an ad to a user and a corresponding purchase on the advertiser's web page within a predetermined time (e.g., seven days). Other forms of conversion are possible. The AMS 106 may store conversion data and other information in a conversion data repository 136.

The AMS 106 may allow the advertisers 102 to input description information associated with ads. This information can be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. In some examples, the AMS 106 may include features for publishers similar to those in the AdSense™ system provided by Google, Inc. The AMS 106 may deliver ads (associated with the advertisers 102) to the user access devices 108 when users access content from the publishers 104. The AMS 106 can be configured to deliver ads that are relevant to publisher sites, site content and publisher audiences.

In some examples, the AMS 106 may crawl content provided by the publishers 104 and deliver ads that are relevant to publisher sites, site content and publisher audiences based on the crawled content. The AMS 106 may also target ads based on user information and behavior, such as particular search queries performed on a search engine website, a geographical location of the user, etc. The AMS 106 may store user-related information (e.g., personal profiles of users, geographic locations of users, ad context information) in a general data repository 146. In some examples, the AMS 106 can add search services (e.g., a Google™ search box) to a publisher site and deliver ads targeted to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to target ads created by the advertisers 102 to the user access devices 108 directly or through the publishers 104. The AMS 106 may target ads to a particular publisher 104 or a requesting user access device 108 when a user requests search results or loads content from the publisher 104.

In some configurations, the AMS 106 may target ads using a searching portion and a content portion. The searching portion may include one or more elements for providing various searching features to the user devices 108 and targeting ads to users based on search terms. The content portion may include one or more elements for targeting ads to users based on content rather than specific terms. The content portion may target ads based on content provided by the publishers 104.

The AMS 106 can target ads using static targeting and/or dynamic targeting. Static targeting may involve targeting ads based on some static publisher-specific placement criteria, such as by site or channel. In static targeting, the advertisers 102 can specify where ads will be served. Dynamic targeting may involve using one or more matching processes that match ads to context, geographic location, language, and other criteria. Various ranking and searching processes can also be used.

The AMS 106 may be configured to identify relevant ads for targeting using various information, such as ad keywords, content keywords, geographic information, web page identifiers and/or content indices. As an example, the AMS 106 can receive a URL (uniform resource locator) of a requested content page (e.g., from the user access device 108 or the publisher 104). The AMS 106 may match the URL to indexed content keywords associated with the URL to determine a user interest. The AMS 106 may then match the user interest with ads in the repository 126 relevant to the interest. The AMS 106 may, for example, use ad keywords from the advertisers 102 and/or other ad information to identify the ads. The AMS 106 can compare ad keywords from the advertisers 102 or other information to content keywords and/or content in the content page to identify relevant ads. In some examples, ad selections and preferences specified by advertisers and/or publishers can be used by the AMS 106 when it selects relevant ads.

In some implementations, the AMS 106 may target ads to publisher content by generating and displaying one or more topical "descriptors." The topical descriptors may include words, phrases or other representations that summarize all or a portion of publisher content or topical variations related to the displayed content 206. For example, if a publisher webpage relates to automobiles, the AMS 106 can display to users topical descriptors that summarize related topical variations, such as automobile rentals, repair, tires, and the like.

The topical descriptors may be operable to allow users to navigate to or through additional ads. For example, the descriptors may be associated with navigation links (e.g., hyperlinks) that direct users to one or more dedicated "ad landing pages." These dedicated "ad landing pages" may include additional ads related to the topics represented by the selected descriptors. For example, when a user selects an "Automobile Tires" descriptor, the user may be directed to a dedicated ad landing page that includes additional ads related to the topic represented by the selected descriptor—in this example, tires.

The AMS 106 may display ads and topical descriptors to users via one or more ad presentations. An ad presentation refers, for example, to any type of communication or display of one or more ads and/or topical descriptors. The AMS 106 may present ads and topical descriptors via various mediums and in various forms, including web based and non-web based mediums and forms. In some examples, ads may be presented in a portion (which can include all) of a user display (e.g., a portion of a displayed webpage). The ad portion can be a discrete, isolated portion of a display or it can be blended and dispersed throughout a display.

The AMS 106 may display ad presentations using one or more embeddable display elements, such as HTML I-Frames, that allow ad presentations to be displayed to users with publisher content. An "embeddable display element" refers, for example, to any element that can be embedded in a location (e.g., a publisher webpage) that allows information (e.g., ads and topical descriptors) from an external source (e.g., the AMS 106) to be displayed in that location. The AMS 106 may use embeddable display elements to insert relevant ads in websites and webpages displaying publisher content.

As further explained below in connection with FIGS. 2-7, the AMS 106 may allow the publishers 104 to host and customize ad presentations. For example, the AMS 106 may allow publishers to customize the look and feel of ad presentations, for example, to match the look and feel of other publisher sites. The AMS 106 may provide this functionality using a "daisy chain" of any number of embeddable display elements (e.g., I-Frames) and by allowing publishers to input customization settings for customizing the presentation of ads displayed in embeddable display elements.

As an example, the AMS 106 may display one or more ads and/or topical descriptors in a first I-Frame or other embeddable display element hosted by the AMS 106. Upon receiving a user selection of a particular ad or topical descriptor in the first I-Frame, the AMS 106 may direct the user to a second I-Frame or other embeddable display element. The second embeddable display element can be displayed in a publisher-hosted ad landing page, which can be formatted and styled according to publisher preferences. The second embeddable display element may have different properties and attributes (e.g., size) than the first embeddable display element. The second embeddable display element can contain ads and other information provided by the AMS 106 and styled to match publisher-specified customization settings. For example, the AMS 106 may present ads in the second display element using a publisher-specified color scheme determined from publisher customization settings.

The AMS 106 may allow publishers to input the customization settings using the publisher front-end interfaces (PFEs). The customization settings can include various settings for controlling aspects (e.g., the look and feel) of displayed ad presentations. The settings can include, for example, display settings (e.g., graphical user interface (GUI) settings) associated with color, size, font, layout, typefaces, justification, banner placement, display type (e.g., text, image, flash, etc.), dynamic element behavior (e.g., the behavior of menus, buttons, etc.). The settings can also include other types of settings, such as language and region (e.g., country) settings.

The customization settings can include location settings that specify the location of publisher ad landing pages. These location settings can include, for example, a URL associated with a publisher landing page. The location settings can be implemented using URL parameters, XML parameters or other parameters, which can be specified by the publisher using the PFEs.

In some examples, the customization settings can include various settings for controlling color schemes of displayed ad presentations. These color settings can include, for example, settings for controlling various interface display elements, such as backgrounds, text, links, visible URLs, borders, lines and the like. The AMS 106 can allow publishers to specify specific colors for active elements, visited elements, underlined elements, italicized elements, bolded elements, etc. For example, a publisher can specify that active links should be displayed in blue while visited links should be displayed in red. As another example, a publisher can specify that an underlined URL should be displayed in yellow while an italicized URL should be displayed in green. Various other color settings can be applied.

In addition to targeting ads, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

The user access devices 108 may include any devices capable of receiving information from the network 110. The user access devices 108 can include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements can be performed by less than the illustrated number of components or even by a single element. The illustrated elements can be implemented as individual processes run on separate machines or a single process running on a single machine.

FIG. 2 illustrates an example data flow 200 within the environment 100. The data flow 200 is an example only and not intended to be restrictive. Other data flows may therefore occur in the environment 100 and, even with the data flow 200, the illustrated events and their particular order in time may vary.

In the data flow 200, the AMS 106 receives customization settings 202 from a particular publisher 104. The AMS 106 may receive the customization settings 202 using the publisher front-end interfaces (PFEs). The customization settings 202 can include various settings and parameters for controlling aspects (e.g., the look and feel) of displayed ad presentations. The settings 202 can include, for example, settings associated with color, size, font, layout, typefaces, justification, banner placement, dynamic element behavior (e.g., the behavior of menus, buttons, etc.), language, and the like.

The customization settings 202 can also include an ad landing page selection made by the publisher 104. This selection may indicate whether the publisher 104 has decided to utilize ad landing pages hosted by the AMS 106 or ad landing pages hosted by the publisher 104 or some other entity. With an AMS-hosted ad landing page, the AMS 106 provides the contents (e.g., ads) of the ad landing page as well as (at least in part) the formatting and style settings. With publisher-hosted ad landing pages, the AMS 106 provides the contents of the landing page but the publisher customizes the page and the contents. If the publisher 104 selects publisher-hosted ad landing pages, the publisher 104 can specify in the customization settings 202 various parameters (e.g., URLs) associated with the location of the publisher-hosted ad landing pages.

During the data flow 200, the publisher 104 may receive a content request 204 from a particular user access device 108. The content request 204 may, for example, include a request for a web document on a given topic (e.g., automobiles). In response to the request 204, the publisher 104 may retrieve relevant content (e.g., an automobile article) from the content repository 124 or some other source.

The publisher 104 may respond to the content request 204 by sending a content page 206 or other presentation to the requesting user device 108. The content page 206 may include the requested content 208 (e.g., the automobile article) as well as a code "snippet" 205 associated with an ad presentation. A code "snippet" or fragment refers, for example, to a method used by one device (e.g., a server) to ask another device (e.g., a browser running on a client device) to perform actions after or while downloading information. In some examples, a code "snippet" may be implemented in JavaScript® code or may be part of HTML or other web page markup language or content.

The AMS 106 may provide the code snippet 205 to the publisher 104 and/or the user access device 108. The code snippet 205 can originate and/or be provided from other sources. The code snippet 205 may facilitate the targeting of ads to the content page 206. In some examples, the AMS 106 can generate the code snippet 205 based on the customization settings 202 and other publisher preferences. The code snippet 205 may include various information describing the manner (e.g., how, when, and/or where) in which ads and/or topical descriptors can be rendered. The code snippet 205 may include JavaScript® parameters reflecting various display settings (e.g., size, font, color, number of ads, display format, etc.), for example, in the customization settings 202. The code snippet 205 may also include URL parameters or other parameters associated with the location of publisher-hosted ad landing pages.

The publisher 104 can access the code snippet 205, for example, using the PFEs. The publisher 104 can insert (e.g., copy and paste) the code snippet 205 from the PFE into the source code of the web pages (e.g., content page 206) on which the publisher 104 wishes to display ads and/or topical descriptors. The code snippet 205 then facilitates the targeting of ads to those pages in which the code snippet 205 has been inserted.

As the requesting user device 108 loads the content page 206, the code snippet 205 causes the user device 108 to contact the AMS 106. In some implementations, the code snippet 205 causes the user device 108 to send to the ad serving system 120 in the AMS 106 a request (e.g., a JavaScript® request) for ads and/or topical descriptors for display with publisher content. The code snippet 205 may pass various parameters and attributes to the ad serving system 120. After contacting the AMS 106, the user access device 108 can receive additional code (e.g., JavaScript® or the like), which causes the content page 206 to load with an ad portion 210.

The ad portion 210 may include any element that allows information to be embedded within the content page 206. In some examples, the ad portion 210 may be implemented as an HTML element, such as an I-Frame (inline frame) or other type embeddable display element. The ad portion 210 can include any portion (which can include all) of a user display. The ad portion 210 can be a discrete, isolated portion of a display or it can be blended and dispersed throughout a display. The ad portion 210 can be a discrete element or it can be dispersed in multiple sub-elements.

The ad portion 210 may be hosted by the AMS 106 and allow information (e.g., ads and topical descriptors) from the AMS 106 or the publisher 104 to be embedded inside the content page 206. Parameters associated with the ad portion 210 (e.g., its size and shape) can be specified in the content page 206 (e.g., in HTML), so that the user access device 108 can present the content page 206 while the ad portion 210 is being loaded. Other implementations of ad portion 210 may also be used.

The ad portion 210 may cause the user access device to send the AMS 106 formatting and content information 212. This information 212 may include information describing the manner (e.g., how, when, and/or where) in which ads and/or topical descriptors can be rendered by the user access devices 108. The information 212 may also include attributes and parameters (e.g., JavaScript® parameters) for ads and topical descriptors, such as size (e.g., maximum number of characters), shape, color, font, presentation style (e.g., audio, video, graphical, textual, etc.), etc. The information 212 may also specify a quantity of ads or descriptors.

The formatting and content information 212 can include information associated with the content 208 displayed in content page 206. Such information may include a URL associated with the requested content page 206. The information 212 can include the requested content itself, a category corresponding to the requested content or the content request, part or all of the content request 204, content age, content type (e.g., text, graphics, video, audio, mixed media, etc.), geo-location information, and the like.

In response to the information 212, the AMS 106 may provide the user access device 108 with ad information 214. The ad information 214 may include one or more ads 225 for placement in the ad portion 210 of the content page 206. The ad information 214 may also include a signed or encoded specification of an ad.

The ad information 214 may include ads that are relevant to user interest. The AMS 106 may retrieve and provide relevant ads based on the information 212 received from the user access device 108. The AMS 106 may retrieve the ad information 216 from the ad repository 126 using the backend processing systems 118. The AMS 106 may for example retrieve relevant ads using information from a crawling module, various keywords, various statistical associations between ads and content, and/or preference information associated with the publishers.

The AMS 106 may also provide the user access device 108 with one or more topical descriptors 227 for placement in the ad portion 210. The topical descriptors 227 can be included in the ad information 214. The AMS 106 may identify and provide the topical descriptors 227 in response to the formatting and content information 212 or other requests/information (e.g., JavaScript requests) from the user access device 108. The AMS 106 may identify the descriptors 227 using one or more processes that identify topics related to context, geographic location, language, and other criteria.

In some implementations, the AMS 106 can link the identified topical descriptors 227 to locations specified in the publisher customization settings 202. For example, the AMS 106 can set a destination URL of the descriptors 227 to point to the URL of the publisher-hosted ad landing page specified in the customization settings 202. The ad serving system 120 can receive the destination URL from the code snippet 205 or the formatting and content information 212.

In one implementation for providing the topical descriptors 227, the AMS 106 can include in the ad information 214 a plaintext version of the descriptors as well as a descriptor token (e.g., an encoded version of the descriptor) signed with a message authentication code, such as HMAC (keyed-hash message authentication code). The authentication code signature can be set to expire after a specified time period, and it can store a unique timestamp or other identifier for preventing theft of the descriptor token.

The ad portion 210 may populate with ads and descriptors, such as the ad 225 and topical descriptor 227. The ad portion 210 and the displayed ads 225 and descriptors 227 may occupy a portion of the content page 206, which may be distinct from other content (e.g., the content 208) in the content page 206.

When a user clicks or otherwise selects the displayed ad 225, an embedded code snippet may direct the user access device 108 to contact the AMS 106. During this event, the user access device 108 may receive an information parcel, such as a signed browser cookie, from the AMS 106. This information parcel can include information, such as an identifier of the selected ad 225, an identifier of the publisher 104, and the date/time the ad 225 was selected by the user. The information parcel may facilitate processing of conversion activities or other user transactions.

The user access device 108 may then be redirected to the advertiser 102 associated with the selected ad 225. The user access device 108 may send a request 216 to the associated advertiser 102 and then load an advertiser landing page 218 from the advertiser 102. The user may then perform a conversion action at the advertiser landing page 218, such as purchasing a product or service, registering, joining a mailing list, etc. A code snippet 220, which may be provided by the AMS 106, may be included within a conversion confirmation page script, such as a script within a web page presented after the purchase. The user access device 108 may execute the code snippet 220, which may then contact the AMS 106 and report conversion data 222 to the AMS 106. The conversion data 222 may include conversion types and numbers as well as information from cookies. The conversion data 222 may be maintained in the conversion data repository 136.

When a user clicks or otherwise selects the displayed topical descriptor 227, the user may be taken to a publisher-hosted landing page 237. The location of the publisher landing page 237 may be specified in the customization settings 202 and linked to the descriptors 227 by the AMS 106. The publisher landing page 237 may be hosted by the publisher 104 and have a look and feel specified by the publisher 104.

The publisher landing page 237 may include a second ad portion 247. The second ad portion 247 may include any element that allows information to be embedded within the publisher landing page 237. Like the ad portion 210, the second ad portion 247 may be implemented as an HTML element, such as an I-Frame, or other type of embeddable display element. The ad portion 247 can include any portion (which can include all) of the publisher landing page 237. The ad portion 247 can be a discrete, isolated portion of a display or it can be blended and dispersed throughout a display. The ad portion 247 can be a discrete element or it can be dispersed in multiple sub-elements.

In some implementations, the ad portion 247 may differ from the ad portion 210. For example, the ad portion 210 may be a first size (e.g., 90×90 pixels) while the ad portion 247 may be a second, larger size. As further explained below in connection with FIGS. 3A and 3B, the ad portions may differ in various other ways.

The ad portion 247 may include code that causes the user access device 108 to send a request 249 (e.g., a JavaScript® request) to the AMS 106. This request 249 may include an indication of the selected topical descriptor, such as descriptor tokens. The request 249 may also include other information similar to the formatting and content information 212, such as various JavaScript® parameters. The request 249 may include various display and language preferences specified in the customization settings 202, which can be passed from the AMS 106, through the ad portion 210 and the publisher landing page 237, to the ad portion 247.

In response to the request 249, the AMS 106 may provide one or more customized ads 257 to the user access device 108. The customized ads 257 may reflect the customization settings 202. For example, the customized ads 257 may be formatted according to color preferences specified in the customization settings 202.

The customized ads 257 may relate to the selected topical descriptor 227. For example, if the selected descriptor 227 relates to automobile tires, the ads 257 may likewise relate to automobile tires. When a user selects the displayed ad 257, an embedded code snippet may direct the user access device 108 to contact the AMS 106. During this event, the user access device 108 may receive an information parcel, such as a signed browser cookie, from the AMS 106. The user access device 108 may then be redirected to the advertiser 102 associated with the selected ad 257. The user access device 108 may send a request (similar to the request 216) to the associated advertiser 102 and then load an advertiser landing page 257 from the advertiser 102. The user may then perform a conversion action at the advertiser landing page 218. A code snippet (e.g., a snippet similar to the code snippet 220) may be used to report conversion data to the AMS 106.

Figure 2A:
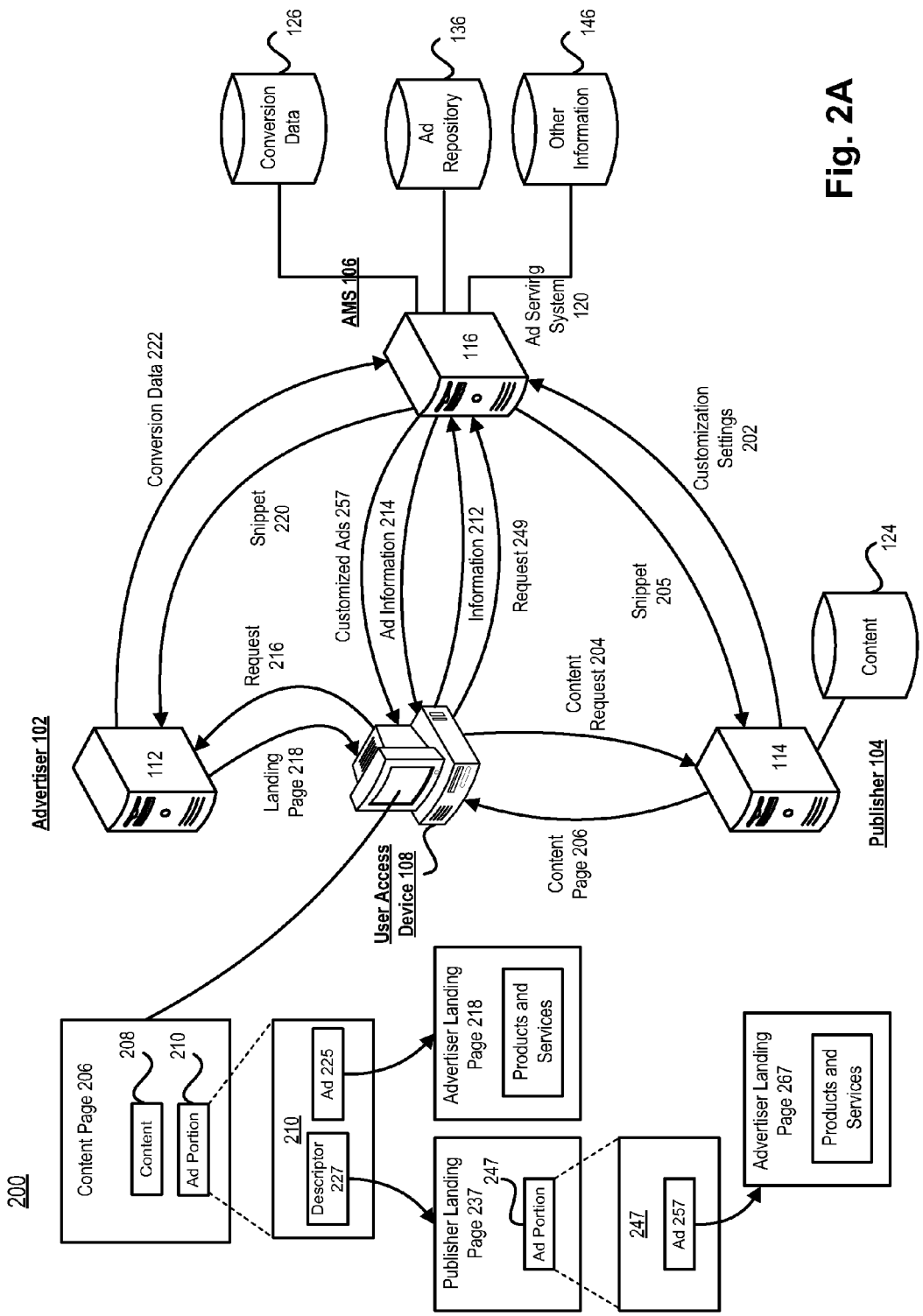
FIG. 2A is a diagram illustrating an example data flow within an advertising environment.
Figure 2B:
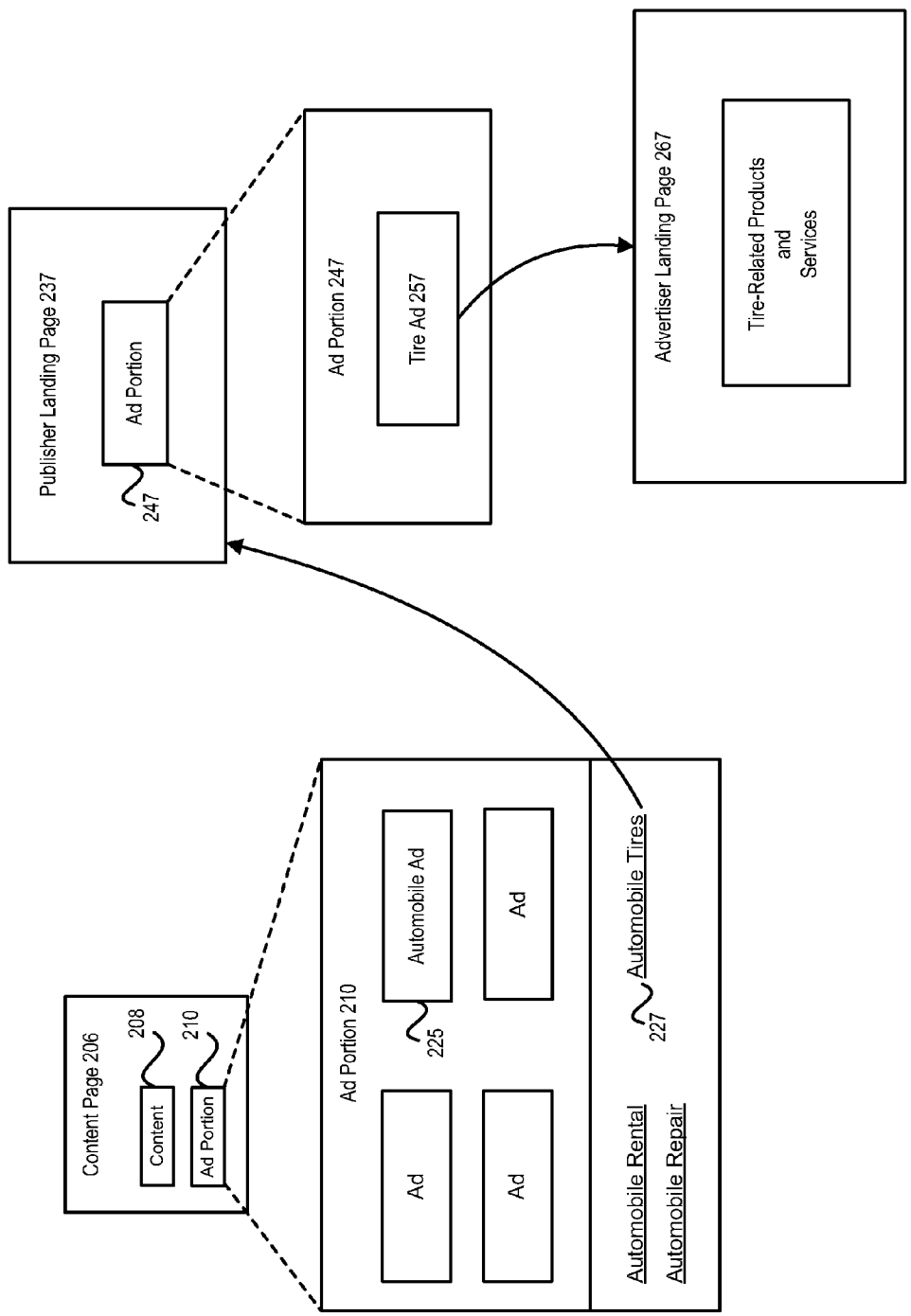
FIG. 2B illustrates information relationships in an advertising environment.

FIG. 2B further illustrates the relationship between the various information elements in data flow 200. As illustrated in FIG. 2B, the ad portion 210 in the content page 206 may include one or more ads 225, such as an automobile-related ad. The ad portion 210 may also include one or more topical descriptors 227, such as an "Automobile Tires" descriptor. The topical descriptors 227 may summarize all or a portion of the displayed content 208 of the content page 206 or topical variations related to the displayed content 208. For example, if the content 208 relates to automobiles, the descriptors 227 may summarize related topical variations, such as automobile rentals, repair, and tires.

The topical descriptors 227 may be operable to allow users to navigate to or through additional ads. The descriptors 227 may be associated with navigation links (e.g., hyperlinks) that direct users to one or more dedicated publisher landing pages. For example, when a user selects the "Automobile Tires" descriptor 227, the user may be directed to the publisher-hosted landing page 237. The publisher hosted landing page 237 may include the ad portion 247, which populates with customized ads 257. As illustrated in FIG. 2B, the ad portion 247 may populate with a tire-related customized ad 257 in response to a selection of the selected "Automobile Tires" descriptor 227. The customized ad 257 may be customized to match a look and feel specified by the publisher 104. When a user selects the customized ad 257, the user may be directed to the advertiser landing 257, where the user can perform a conversion.

FIGS. 2A and 2B illustrate examples only and are not intended to be restrictive. Other data flows may therefore occur in the environment 100 and, even with the data flow 200, the illustrated events and their particular order in time may vary. Further, the illustrated events may overlap and/or may exist in fewer steps. Moreover, certain events may not be present and additional and/or different events may be included.

In alternative data flows, the publisher 104 can send an ad request to the AMS 106 prior to sending a content page to the user access device 108. The AMS 106 may respond by sending relevant ads to the publisher 104. The publisher 104 may combine the received ads with requested content in the content page and then send the content page, including the ad portion, to the user access device 108 for display to a user.

In alternative data flows, the AMS 106 may target ads to the user access devices 108 based on search terms provided by the user access devices 108. In these dataflows, the AMS 106 may provide searching services and receive search terms directly from the user access devices. The AMS 106 can also receive search terms from a dedicated searching system that receives user search requests. The AMS 106 may target ads to the user access devices based on the received search terms and ad keywords provided by the advertisers. Other modifications to the data flow 200 are also possible.

Although the above discussion in connection with the data flow 200 refers to first and second embeddable display elements (e.g., ad portions), any number of embeddable display elements can be linked in a "daisy chain" fashion. Furthermore, the embedded display elements are not limited to publisher-hosted sites and can be embedded in various other sites not associated with publishers.

Figure 3A:
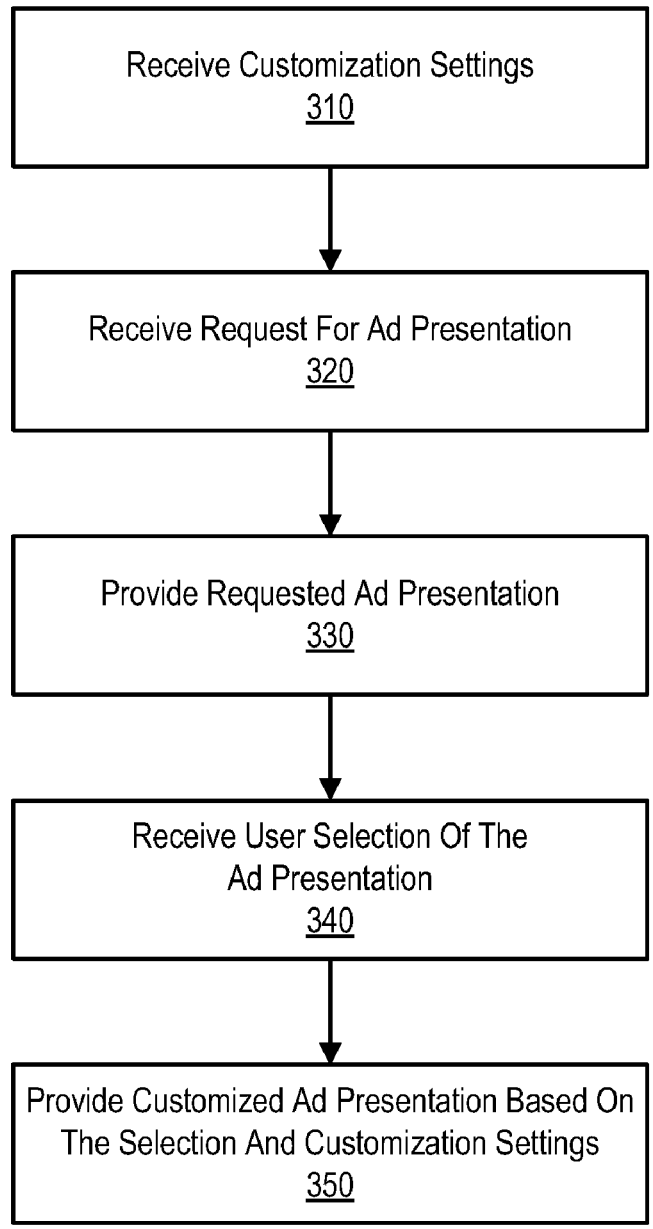
FIG. 3A is a flow diagram depicting an example process for customizing ad presentations.
Figure 3B:
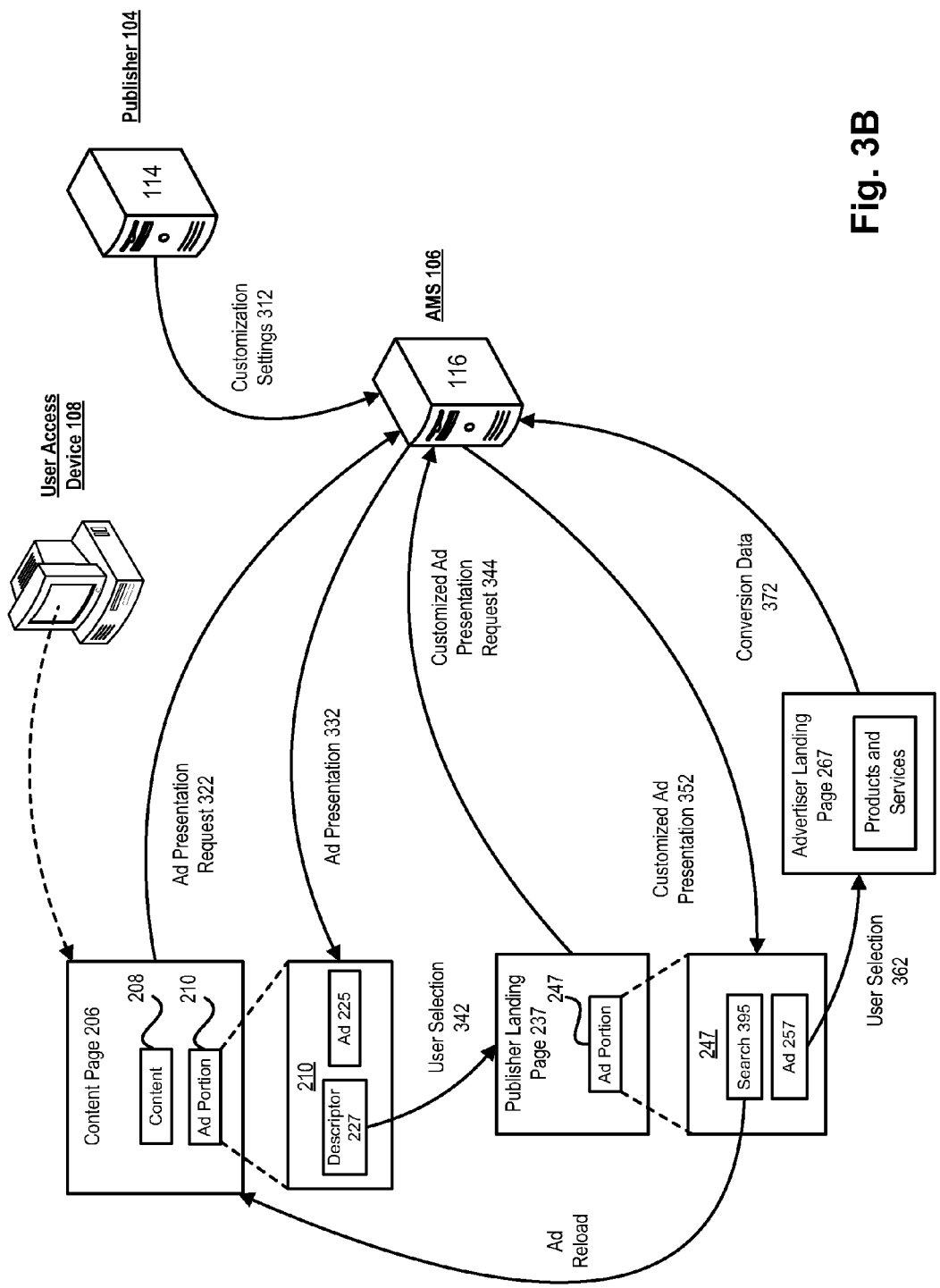
FIG. 3B is a data flow diagram illustrating aspects of the example ad presentation customization process of FIG. 3A.

FIGS. 3A and 3B collaboratively illustrate an example ad presentation customization process 300. In some implementations, the process 300 may be performed by one or more elements in the AMS 106. The process 300 can be performed by other systems in conjunction with or instead of the AMS 106. The process 300 may receive customization settings (310), receive a request for an ad presentation (320), provide the requested ad presentation (330), receive a user selection of the ad presentation (340), and provide a customized ad presentation based on the user selection and the customization settings (350).

The process 300 may receive customization settings (310). This can involve the publisher 104 inputting customization settings 312 to the AMS 106 using one or more of the PFEs. The customization settings 312 may be similar to the settings 202. Receiving customization settings (310) may involve receiving various settings for controlling aspects (e.g., the look and feel) of displayed ad presentations. The settings can include, for example, display settings associated with color, size, font, layout, text justification, banner placement, typefaces, dynamic element behavior (e.g., the behavior of menus, buttons, etc.). The settings can also include other types of settings, such as language settings.

In some examples, the customization settings can include various settings for controlling color schemes of displayed ad presentations. These color settings can include, for example, settings for controlling various interface display elements, such as backgrounds, text, links, visible URLs, borders, lines and the like. The AMS 106 can allow publishers to specify specific colors for active elements, visited elements, underlined elements, italicized elements, bolded elements, etc.

Receiving customization settings (310) can also include receiving an indication as to whether the publisher 104 has decided to utilize ad landing pages hosted by the AMS 106 or ad landing pages hosted by the publisher 104 or its proxy. If the publisher 104 selects publisher-hosted ad landing pages, the publisher 104 can specify in the customization settings various parameters (e.g., URLs) associated with the location of the ad landing pages hosted by or otherwise affiliated with the publisher 104.

In some examples, receiving customization settings (310) may involve presenting an interface through which the publishers 104 can view customization options and input customization settings and parameters. Presenting an "interface" may involve generating and presenting any type of physical or virtual mechanism by which a user (or system) can input information (e.g., the customization settings) to the AMS 106 or other system and/or by which a user (or system) can perceive information generated by such systems. In some examples, presenting an interface can involve generating and presenting a visual interface (e.g., a GUI), for example, using one or more of the front-end interfaces (e.g., the PFEs) in the AMS 106. Other types of interfaces can also be used, including non-visual interfaces.

Presenting an interface may involve presenting various interface elements for presenting options and facilitating the input of customization settings. The interface elements can include one or more physical or virtual elements or widgets that allow a user (or system) to view, select and/or indicate information. Presenting interface elements can include generating and presenting various selection buttons, check boxes, radio buttons, toggle buttons, list boxes, pull- or drop-down lists/menus, spinners, combo boxes, check lists, select boxes, dialogue boxes, pop-ups, windows, etc. In some examples, interface elements can include text fields in which users can input descriptions (e.g., descriptions of customization settings or URLs) for analysis and processing by the AMS 106.

The process 300 may receive a request for an ad presentation (320). This may involve the AMS 106 receiving a request for an ad presentation from a browser or other information access mechanism associated with the user access device 108. The AMS 106 may generate a code snippet (e.g., JavaScript®) based on the received customization settings. The publisher 104 can access this code snippet in, for example, the PFEs in the AMS 106. The publisher can insert the code snippet into the source code of the sites on which the publisher 104 wishes to have ad presentations rendered. The code snippet can then cause its host site to send a request for an ad presentation when the site is loaded.

As an example, referring to FIG. 3B, a user can be viewing a content-related site hosted by the publisher 104 (e.g., a publisher's HTML content page 206) in a browser on the user access device 108. The content-related site may include an embedded code snippet (not shown) for facilitating ad targeting. As the user is viewing the publisher's content-related site, the code snippet can cause the browser to send an ad presentation request 322 to the AMS 106. The ad presentation request 322 can include a JavaScript® request. The ad presentation request 322 can include, for example, a request for one or more topical descriptors that summarize one or more aspects of publisher content. For example, if the content-related site were displaying content related to automobile or mechanics, the topical descriptors can include terms such as "Cars," "Motorcycles," "Tires," etc.

Receiving a request for an ad presentation (320) can include receiving various formatting and content parameters (e.g., JavaScript® parameters). For example, the ad presentation request 322 can include parameters associated with presenting descriptors, such as size parameters (e.g., maximum number of characters), shape parameters, color parameters, font parameters, presentation style parameters (e.g., audio, video, graphical, textual, etc.), etc. The ad presentation request 322 may also specify a quantity of descriptors desired. An example JavaScript® ad presentation request is shown below:

```
<!--
<script type="text/javascript" language="JavaScript">
```

```
ad_client='ca-pub-xxxxxxxxxxxxxx';
ad_width=120
ad_height=600;
ad_safe='high';
ad_output='html';
num_descriptors=10;
max_descriptor_len=30;
</script>
//-->;
```

Receiving a request for an ad presentation (320) can involve receiving a descriptor destination parameter. This parameter can be set by the publisher 104 (e.g., using the PFEs in the AMS 106). The descriptor destination parameter specifies the location of an ad-related site (e.g., publisher landing page 237) hosted by the publisher 104. In some examples, the descriptor destination parameter can be implemented as a URL parameter in the ad presentation request. For example, the following parameter can be added to the above-mentioned JavaScript® request:

descriptor_dest_url="http://www.example-site.com/descriptor/show_descriptor_ads.html"

The descriptor destination parameter and other parameters can be specified in the code snippet embedded in the content page 206 source code.

In some implementations, receiving a request for an ad presentation (320) can involve receiving a request for ads. In some examples, the ad targeting request may include information associated with a request for publisher content. The ad targeting request may cause the AMS 106 to target ads to the requested publisher content, for example, by targeting ads to a publisher 104 or a user access device 108. As an example, receiving an ad targeting request can involve a publisher 104 receiving a content request (e.g., a search request, a request to access a webpage, etc.) from a user access device 108 and the publisher 104 providing information associated with the content request (e.g., search terms, a requested URL, the content request itself, user location, formatting information, ad parameters, etc.) to the ad serving system 120 in the AMS 106. In some examples, the ad targeting request may include information similar to the formatting and content information 212 discussed above in connection with FIG. 2.

After receiving a request for an ad presentation, the process 300 may provide the requested ad presentation (330). This may involve identifying, generating and/or providing a requested number of descriptors and/or ads to the requesting user access device 108. As illustrated in FIG. 3B, for example, the AMS 106 can provide an ad presentation 332 to the user access device 108. The ad presentation 332 may include, for example, the ad 225 and/or the descriptor 227. Providing the requested ad presentation (330) may involve rendering the requested ad presentation (e.g., the ad 225 and the link 227) in a first embeddable display element, such as an HTML I-Frame, embedded in a content-related site hosted by the publisher 104. For example, the ad presentation can be rendered in the ad portion 210 of the content page 206.

The process 300 may identify or generate relevant ads and descriptors based on the ad presentation request. This may involve searching the ad repository 136 for ads. The searching may involve searching for ads that are relevant to publisher content requested by a user. Relevant ads may be determined based on specific advertiser settings and instructions, and/or they may be determined using one or more matching, ranking and/or searching processes that match ads to context, geographic location, language, and other criteria. In some implementations, the backend systems 118 in the AMS 106 may identify relevant ads and descriptors.

In some implementations, providing the requested ad presentation (330) may involve linking descriptors to destinations (e.g., URLs) specified in the received customization settings. These destinations can be passed as parameters from the requesting content-related publisher site (e.g., the content page 206) to the AMS 106 and then from the AMS 106 to the first embeddable display element (e.g., the ad portion 210).

Providing the requested ad presentation (330) may also involve providing a plaintext version of the requested descriptors as well as a descriptor token signed with a message authentication code, such as HMAC. The authentication code signature, which can be set to expire after a specified time period, can store a unique timestamp or other identifier for preventing theft of the token. The AMS 106 may be configured to only serve ads targeted to tokens, to prevent gaming of the system.

The process 300 may receive a user selection of the ad presentation (340). This may involve a user (or system) selecting one or more ads or descriptors in the embedded display element in which the ad presentation occurs. For example, as illustrated in FIG. 3B, a user can effect a user selection 342 of the descriptor 227 in the ad portion 210. Effecting user selection 342 may involve, for example, a user clicking or otherwise selecting the descriptor 227 in a display (e.g., browser) provided by the user access device 108.

After receiving a user selection of the ad presentation, the process 300 may provide a customized ad presentation based on the user selection and the customization settings (350). This may involve rendering a customized ad presentation in an advertisement-related site (e.g., webpage) hosted by (or otherwise associated with) the publisher 104. The providing (350) may involve directing the user to the ad-related site. The location of the ad-related site can be specified in the customization settings and can be passed as a parameter to the embedded display element in which the ad presentation selection occurs. As illustrated in FIG. 3B, the user selection 342 may cause the user to be directed to the publisher landing page 237, which can be hosted by the publisher 104. In some examples, descriptor selections may not require logging and redirecting by the AMS 106 and the user can therefore be taken directly to the publisher landing page 237 without being redirected by the AMS 106.

Providing the customized ad presentation (350) may involve rendering the customized ad presentation in a second embeddable display element (e.g., an HTML I-Frame) embedded in the ad-related site hosted by the content publisher. For example, as illustrated in FIG. 3B, the process 300 may embed the ad portion 247 in the publisher landing page 237. In some implementations, the ad portion 247 may differ from the ad portion 210. For example, the ad portion 210 may be a first size (e.g., 90×90 pixels) while the ad portion 247 may be a second, larger size (e.g., 300×250). The ad portion 247 can also include additional and/or different features than those in the ad portion 210.

The second embeddable display element (e.g., the ad portion 247) can cause the user access device 108 (e.g., the browser) to initiate a request (e.g., a JavaScript® request) for an ad presentation to be rendered in the second embeddable display element on the publisher ad-related site. For example, as illustrated in FIG. 3B, the ad portion 247 can cause a browser displaying the publisher ad landing page 237 to send the AMS 106 a customized ad presentation request 344.

The customized ad presentation request 344 can include an indication of the ad presentation selection (e.g., the selected descriptor 227). In some examples, the customized ad presentation request 344 can include descriptor token values passed as parameters during the providing of the requested ad presentation (e.g. the ad presentation 332) during stage 330 of the process 300. The publisher 104 can set the token variables to the passed values.

Passing the token instead of the descriptor itself can prevent tampering and system gaming. Nonetheless, in alternative implementations, the descriptor itself can be passed instead of tokens. If a publisher passes a clear text keyword to the AMS 106, then the AMS 106 can check the clear text against the encoded version to determine if a publisher is attempting to game the system. This information can be used for spam detection or blacklisting repeat offenders. The ad result can also be checked for negative content.

In addition to the descriptor indication, the customized ad presentation request 344 can include various information similar to that included in the ad presentation request 322, such as formatting and content parameters. The publisher ad presentation request 344 can also include various additional customization settings (e.g., color scheme variables) passed as parameters.

The publisher 104 can choose where the publisher ad landing page 237 is hosted. If the publisher 104 hosts the ad landing page, then the publisher can specify various customization options. A tool can provided in the PFE in the AMS 106 to generate JavaScript® or other code fragments or snippets that the publisher 104 can copy and insert into the source code of the publisher ad landing page 237. These code fragments can be used to effect the customized ad presentation request 344. This tool may be in addition to a tool provided for generating JavaScript® or other code fragments for the ad presentation requests. An example JavaScript® fragment for effecting a customized ad presentation request (e.g., 344) is shown below. The example fragment can be inserted in the source code of a publisher ad landing page (e.g., the publisher ad landing page 237).

```
<!--
-->
<script language="JavaScript">
<!--
ad_client='ca-pub-xxxxxxxxxxxxxxx';
ad_channel='descriptors';
ad_width='300'; //substitute width
ad_height='250'; //substitute height
ad_format='300x250_as'; //substitute format
ad_type='text, image, flash'; //type of ads to display
AMS_language='ru';
AMS_country='ru';
AMS_page_url='http://www.example.com';
AMS_encoding='utf8';
AMS_safe='high';
AMS_adtest='on';
AMS_ad_section='default';
AMS_alternate_ad_url=' ';
AMS_alternate_color=' ';
color_background='cccccc'; //ad background color is gray
color_border='ff0000'; //ad borders are red
color_line='00ff00'; //lines surrounding ads are green
color_link='0000ff'; //link is blue
color_text='00723d'; //ad text is sage green
color_url='00723d'; //ad's visible URL is sage green
color_link_active='00ff00'; //active ad link is blue
color_link_visited='ff0000'; //visited ad link is red
color_url_active='00ff00'; //active URL is blue
color_url_visited='ff0000'; //visited URL is red
//-->
</script>
```

Providing the customized ad presentation (350) may involve identifying and/or generating one or more ads (or additional descriptors) for placement in the display element (e.g., the ad portion 247) embedded in the publisher-hosted ad-related site (e.g., the landing page 237). The AMS 106 may identify relevant ads and descriptors using various matching, searching and ranking processes.

The providing (350) may involve customizing identified ads or descriptors based on the received customization settings. The customization settings can be specified as parameters, which are passed, for example, in the customized ad presentation request 344 received from the publisher landing page 237. Customizing the ads or descriptor can involve formatting or otherwise controlling ads/descriptors in accordance with publisher-specified color schemes, sizes, fonts, layouts, typefaces, justification preferences, placement preferences, display types (text, image, flash, etc.), dynamic element behaviors, language preferences, and other customization settings.

The customized ads or descriptors can be related to the received selection of the ad presentation (340). For example, if the user selects a "Motorcycle" descriptor in the ad presentation, then the customized ads can relate to motorcycles. Customized descriptors can include, for example, additional motorcycle-related terms.

Providing the customized ad presentation (350) may involve rendering the identified and customized ads (or descriptors) in the embeddable display element embedded in the ad-related site hosted by or otherwise associated with the publisher 104. For example, as illustrated in FIG. 3B, the AMS 106 may send a customized ad presentation 352 to the user access device 108 for placement in the ad portion 247 embedded in the publisher landing page 237. The customized ad presentation 352 may include one or more ads, such as ad 257, customized based on the received publisher customization settings. As an example, the ad 257 may be customized with a color scheme specified in the received publisher customization settings.

When a user selects a customized ad (e.g., the ad 257), the user can be directed to the advertiser 102 associated with the selected ad 257. For example, in response to a user selection 362 of the customized ad 257, the user access device 108 may send a request to the associated advertiser 102 and then load an advertiser landing page 267 from the advertiser 102. The user may then perform a conversion action at the advertiser landing page 267, such as purchasing a product or service, registering, joining a mailing list, etc. Conversion data 372 can then be provided to the AMS 106. The conversion data 372 may include information similar to that included in the conversion data 222.

In some examples, providing the customized ad presentation (350) may involve adding features to the second embeddable display element embedded in the publisher ad-related site. For example, as illustrated in FIG. 3B, the AMS 106 can add search features 395 (e.g., a Google™ search box) to the ad portion 247. In response to user inputs, the search features 395 can cause a publisher site (e.g., the content page 206) to reload with different ads. As an example, the ad portion 210 may display ads and descriptors related to automobiles. A user may select one of these automobile-related descriptors in the ad portion 210 and then be directed to the ad portion 247, which displays ads related to the selected descriptor. If the user inputs the term "hotels" in a search box provided in the ad portion 247, then the content page 206 can reload with ads related to hotels. These hotel-related ads may be different than ads previously displayed in the content page 206 when the user selected the descriptor 227 that directed the user to the ad portion 247.

In some implementations, the process 300 may perform various operations to maintain state information. For example, as discussed above, the process 300 may maintain state information by passing parameter and attributes. The process 300 may pass parameters and attributes (e.g., using JavaScript® and click strings) from a publisher's content site (e.g., the content page 206) to the first embedded display element (e.g., the first I-Frame) and then from the first embedded display element through the publisher-hosted ad landing page (e.g., the ad landing page 237) to the second embedded display element. In this fashion, the process 300 can maintain state information while servicing requests for ad presentations.

Passing parameters is merely an example technique that the process 300 can employ to maintain state. Various other techniques can also be used, in addition to or instead of passing parameters. For example, the process 300 can use cookies or other information parcels to maintain state. As another example, the process 300 can maintain state using one or more server side operations and client identifiers.

Although the above discussion in connection with the process 300 refers to a first embedded display element and a second embedded display element, any number of series-linked embedded elements can be implemented. The linked embedded display elements can form a "daisy chain" of embedded elements. Furthermore, the embedded display elements are not limited to publisher-hosted sites. The process 300 may be applied to various alternative applications in which embedded display elements are embedded in other locations, such as AMS-hosted sites and/or advertiser-hosted sites. Moreover, the process 300 is not limited to advertising applications and can be applied to various alternative applications in which linked embedded display elements can be used.

The illustrated configurations and sequences of events in FIGS. 3A and 3B are examples and not intended to be limiting. Other processes and configurations may therefore be used and, even with the process depicted in FIGS. 3A and 3B, the illustrated events and their particular order in time may vary. Further, the illustrated events may overlap and/or may exist in fewer steps. Moreover, certain events may not be present and additional events may be included in the illustrated process.

Example Data Processing System Configuration

Figure 4:
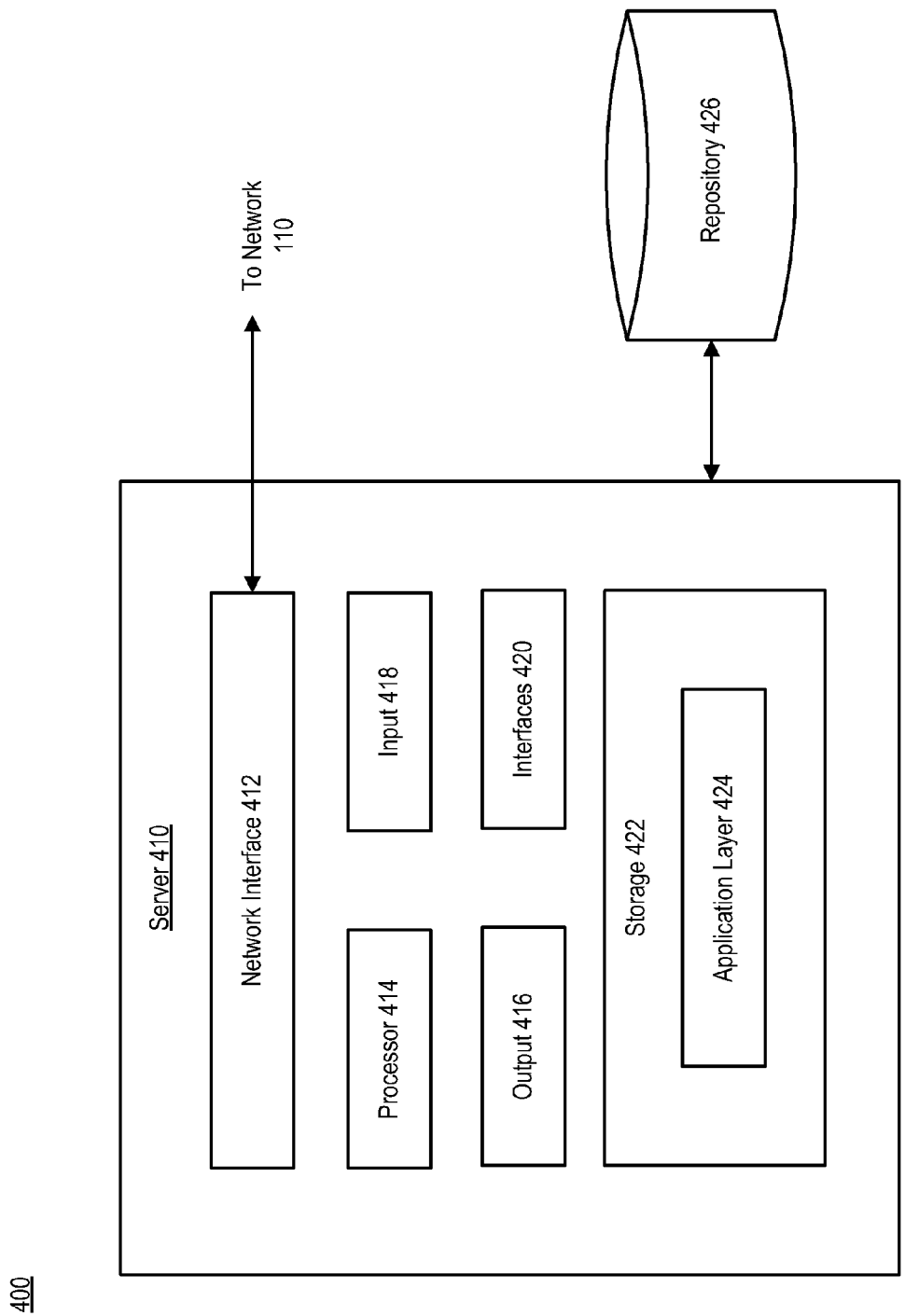
FIG. 4 is a block diagram of an example data processing system configuration.

FIG. 4 illustrates an example configuration 400 of a server system 410. In some implementations, the data processing systems 112, 114 and 116 depicted in FIG. 1 can be configured in a manner consistent with configuration 400. The configuration 400 is an example only, and the systems 112, 114 and 116 can be configured in other ways. Further, each of the servers can have its own individual structure and configuration. Moreover, as noted above, the functions provided by the systems 112, 114 and 116 can be performed by a single server computer or can be performed by a single server process running on a single computer.

In the configuration 400, the server 410 may include various components, such as a network interface 412, a processor 414, an output 416, an input 418, interfaces 420, and a storage 422. One or more system buses (not illustrated) may interconnect these components. The number, identity and arrangement of elements in the configuration 400 are not limited to what is shown, and additional and/or different elements may be contained in or coupled to the elements shown. Further, configuration 400 may include fewer components than what is illustrated.

The network interface 412 may facilitate connectivity with a network, such as the network 110. Network interface 412 may be any appropriate wireline (e.g., IEEE 1394, USB, etc.) or wireless (e.g., IEEE 802.11™, Bluetooth®, IrDA®, etc.) mechanism for facilitating unidirectional or bidirectional transmission of data between the server 410 and a network. The network interface 412 may include one or more network cards and/or data and communication ports.

The processor 414 routes information among components and executes instructions from storage 422. Although FIG. 4 illustrates a single processor, the server 410 may include any number of general- and/or special-purpose processors. The processor 414 may be implemented, for example, using one or more commercially available INTEL® processors.

The output 416 may present text, images, video, audio, or any other type of information. Examples of the output 416 include, video display devices, audio display devices, printers, and the like. The output 416 may display user interface information for various software applications running on the server 410, as well as the operating system programs necessary to operate the system. The output 416 may present information by way of a cathode ray tube, liquid crystal, liquid crystal on silicon, light-emitting diode, gas plasma, laser, or other type of display mechanism. The output 416 can also be configured to receive, generate and/or present holographic or other visual representations. The output 416 may be configured to audibly present information, and it may include suitable components for receiving and presenting audio signals. Although FIG. 4 illustrates a single output 416, the server 410 may include any number of similar or different output devices.

The input 418 may include components such as a keyboard, a mouse, a pointing device, a joystick, and/or a touch screen. The input 418 may also include audio- or video-capture devices (e.g., video cameras, microphones, etc.) and/or various sensors for sensing emissions (e.g., thermal, motion, sound, etc.). It may also include one or more information reading devices (e.g., scanners, disk drives, etc.) and/or input ports. Although FIG. 4 depicts the input 418 as a single discrete element, the server 410 may include any number of similar or different input devices. For example, the server 410 can include a keyboard and a mouse as well as a video-capture device, a scanner and several disk drives.

A user of the server 410 may input commands to control and operate functionality of the server 410 by way of the output 416 and the input 418. These commands may, for example, be input by way of user manipulation of physical controls, such as a keyboard or mouse. The user may input commands to select and manipulate graphics and text objects presented on the output 416 in order to operate and control the server 410.

The interfaces 420 may include various interfaces for facilitating bidirectional or unidirectional communication between the server 410 and one or more peripheral or other devices. The peripheral devices may include, for example, output devices (e.g., a monitor, a printer, a speaker, etc.), input devices (e.g., a keyboard, a mouse, a scanner, etc.), or any other device operable to connect to the server 410. The interfaces 420 may include a combination of hardware, software and/or firmware components. The interfaces 420 may include various connection ports, such as USB, RS-232, RS-485, Fibre Channel, Ethernet, IEEE 1394, RG-6, and/or TOSLINK.

The storage 422 may provide mass storage and/or cache memory for the server 410. The storage 422 may be implemented using a variety of suitable memory elements. The memory elements may include, for example, solid state elements, optical elements, polymer elements, magnetic elements, and/or organic elements (e.g., crystals). The memory elements may be volatile or non-volatile and may be randomly or sequentially accessed. The storage 422 may include random access memory (RAM), flash RAM, read-only memory (ROM), erasable programmable read-only memory (EPROM), and electrically erasable programmable read-only memory (EEPROM). The storage 422 may include one or more fixed disk drives (e.g., a hard drive, RAID storage, etc.) and one or more removable disk drives (e.g., a CD-ROM drive, DVD drive, etc.). Although a single storage module is shown, the server 410 may include any number of individually configured storage modules.

The storage 422 may store program code for various applications, an operating system (e.g., Windows® XP, Linux® OS), an application-programming interface, application routines, middleware components, and/or other executable instructions. The storage 422 may include program code and information for communications (e.g., TCP/IP communications), middleware components, kernel and device drivers, invariant low-level systems code, data for basic input and output, and various configuration information.

The storage 422 may maintain an application layer 424, which may include various software programs and modules. Such programs and modules can be transferred to a hard drive (not shown) in the storage 422 by way of network transmissions (e.g., an Internet download) and/or removable disks (also not shown), such as a CD-ROM or DVD.

In the configuration 400, the server 410 may be coupled to one or more repositories 426. In some examples, the repositories 124, 126, 136 and 146 may be implemented in a manner consistent with the repositories 426. The repository 426 may include any structured collection or aggregation of information that is stored and accessible. In some implementations, the repositories 426 may include one or more structured data archives distributed among one or more network-based data processing systems. The repositories 426 may include one or more schemas for organizing stored information. In some examples, the repositories 426 may include one or more relational databases and systems, distributed databases, object-oriented databases, and/or any other types of databases. Examples of databases include Oracle® databases, IBM DB2® systems, MySQL® databases, XML databases, and the like. Although illustrated as coupled to the server 410, the repositories 426 can be distributed and/or included in various systems and/or networks.

Example Application Layer Configuration

Figure 5:
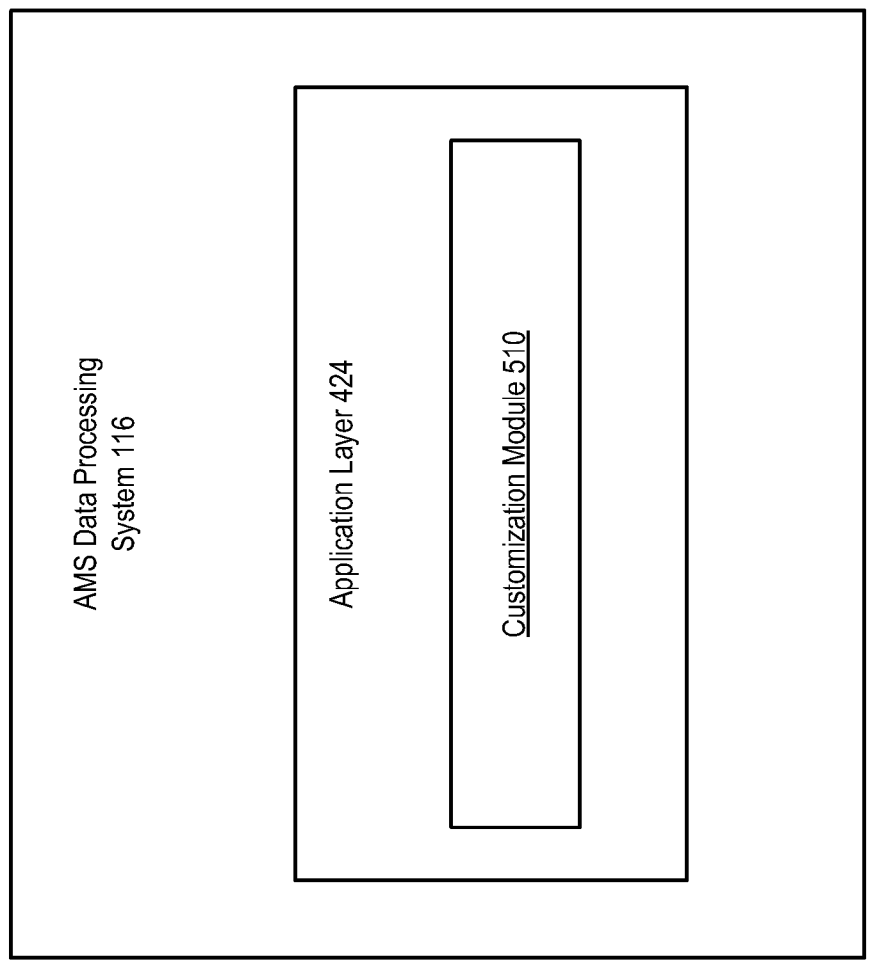
FIG. 5 is a block diagram of an example application layer configuration.

FIG. 5 is a block diagram of an example configuration 500 of the application layer 424, which may be maintained in the storage 422 of the server 410. The configuration 500 may represent the configuration of an application layer of a data processing system 116 maintained by the AMS 106. As illustrated in FIG. 5, the application layer configuration 500 may include a customization module 510.

While the module 510 is depicted as a single module located in a single data processing system 116, other configurations are possible. The functionality of the module 510 can be distributed or exist in more modules that what is illustrated in FIG. 5. In some examples, the module 510 can be distributed, with certain functionality of the module 510 located in a backend system 118 and other functionality of the module located in the ad serving system 120. The module 510 can be distributed in various other ways as well.

The module 510 may include and/or use one more data structures as well as one or more computational algorithms that may operate on various data. The module 510 may include one or more sets of instructions for performing various tasks, and the module may output information for use by users or other systems. In some implementations, the module 510 may include one or more engines, which may output code (e.g., source code, HTML, etc.) that serves as input to other systems, engines or processes.

The module 510 may be implemented using any programming or other language suitable for controlling behavior of a system, such as a computer. In some examples, the module 510 may be implemented using one or more of C/C++, Java, Visual Basic, eXtendible Markup Language (XML), HTML and other languages.

Although depicted within software application layer 424, the module 510 can include and/or be coupled to various hardware elements (within or external to the server 410). For example, the module 510 can include one or more neural networks, which may employ software and hardware processing elements or agents linked together. In some examples, the module 510 can include or use one more embedded systems, such as microcontrollers, routers, etc.

The customization module 510 may be configured to provide various functionality associated with allowing the publishers 104 to customize ad presentations and host ad-related sites. In some implementations, the customization module 510 may be configured to provide one or more features associated with AdWords™ and/or AdSense™ provided by Google, Inc. In some implementations, the customization module 510 (independently or in conjunction with other systems and modules) can perform aspects of the process 300 illustrated in FIGS. 3A and 3B. For example, the customization module 510 may provide a tool that allows a publisher to input customization settings and that generates JavaScript® fragments or snippets that the publisher can copy and insert into the source code of an ad-related site hosted by the publisher. The review module 510 may be configured with executable instructions that perform aspects of the process 300.

Example User Access Device Configuration

Figure 6:
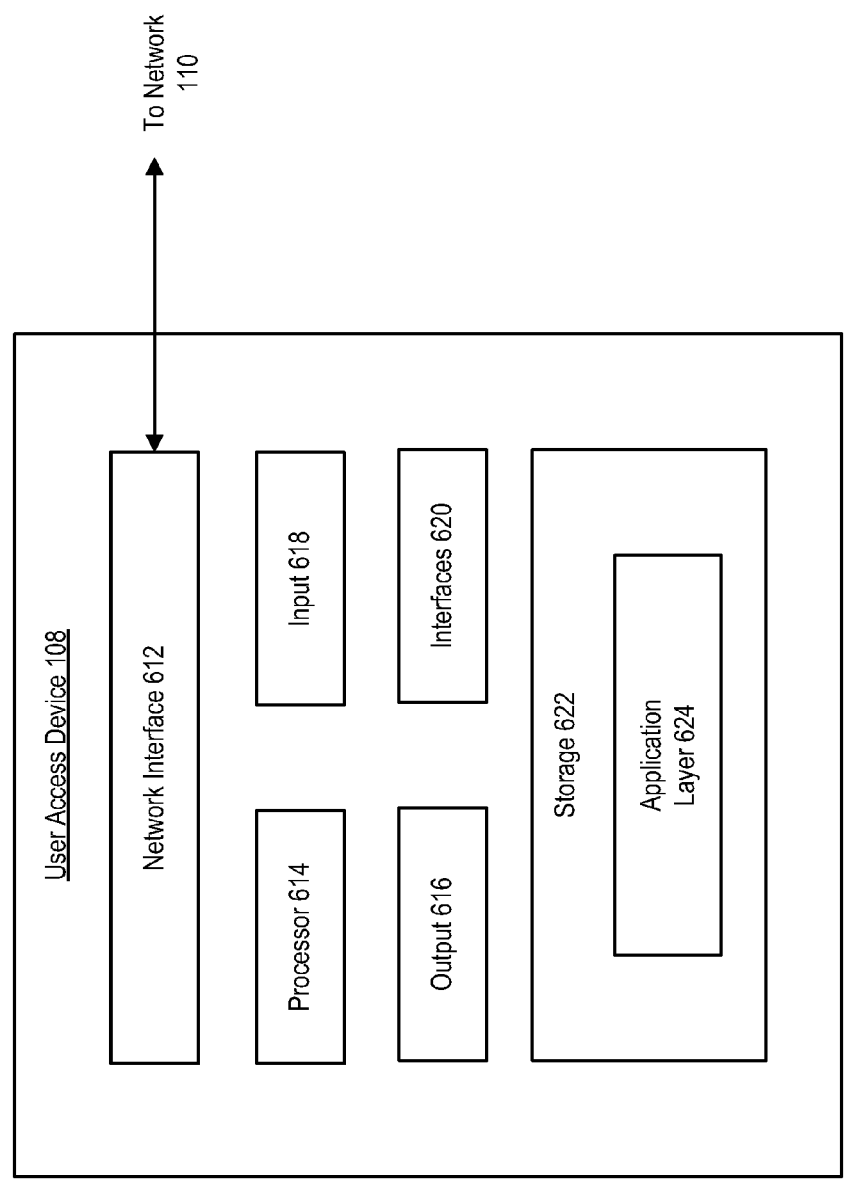
FIG. 6 is a block diagram of an example user access device configuration.

FIG. 6 is a block diagram of an example configuration 600 of the user access devices 108 in environment 100. The number, identity and arrangement of elements in the configuration 600 are not limited to what is shown, and additional and/or different elements may be contained in or coupled to the elements shown. The configuration 600 is an example only, and the user access device 108 can be configured in other ways.

In the example configuration 600, the user access devices 108 may include various components, such as a network interface 612, a processor 614, an output 616, an input 618, interfaces 620, and a storage 622, which may maintain an application layer 624. The components illustrated in FIG. 6 (i.e., 612, 614, 616, 618, 620, 622, and 624) may be similar in structure and functionality to those components described in connection with FIG. 4 (i.e., 412, 414, 416, 418, 420, 422, and 424). In some implementations, however, one or more of the user access devices 108 may include components that are structurally and functionally different from those described in connection with FIG. 4. For example, the user access devices 108 may be configured with different (e.g., less) storage capacity and different application layers than the server system. In some examples, the application layer 624 in a user access device may include one or more modules configured to present various viewers (e.g., browsers) to users. The application layer 624 may also include one or more modules for interacting with other elements (e.g., data processing systems 112, 114 and/or 116), receiving and processing ads, and/or combining received ads with received content for presentation to users.

The user access devices 108 can also be configured with less or different processing capabilities than that of the server system. In some examples, the user access devices 108 may include various user interface components (e.g., keypads, display devices, speakers, microphones, etc.) while the server system may lack such (or even any) user interface components. In some examples, the server system 410 can be a general purpose server while the user access devices 108 can include embedded systems optimized with specific components for performing specific tasks.

The foregoing description does not represent an exhaustive list of all possible implementations consistent with this disclosure or of all possible variations of the implementations described. Other implementations are within the scope of the following claims.

What is claimed is:

1. A computer-implemented method comprising:
receiving a request for an advertisement presentation to be displayed with a first content page of a content-related site that is hosted by a content publisher;
providing, by one or more computers, the requested advertisement presentation for display with the first content page, the advertisement presentation including at least one advertisement and a link to a landing page associated with a sponsor of the advertisement, and a selectable descriptor that is indicative of a category to which at least a portion of the content-related site belongs, the selectable descriptor including a different, second link to a page associated with the content publisher that, in response to user interaction with the selectable descriptor, causes the user device to request presentation of the page associated with the content publisher; and
in response to receiving data indicative of a user interaction with the selectable descriptor, providing, by one or more computers, an advertisement for presentation with the page associated with the content publisher.

2. The method of claim 1, wherein the advertisement for presentation with the page associated with the content publisher is selected based, at least in part, on content of the selectable descriptor, the advertisement including a link to an advertisement landing page that is hosted by an advertiser.

3. The method of claim 1, further comprising:
receiving customization settings from the content publisher, the customization settings controlling a manner in which information is displayed at a user device; and
customizing, based on the received customization settings, the advertisement for presentation with the page associated with the content publisher.

4. The method of claim 3, wherein receiving customization settings comprises receiving parameters associated with a color scheme.

5. The method of claim 3, wherein a location of the page associated with the content publisher is included in the received customization settings.

6. The method of claim 5, wherein providing the requested advertisement presentation comprises providing the selectable descriptor in a first hypertext markup language (HTML) inline frame embedded in the content-related site.

7. The method of claim 6, wherein providing the advertisement for presentation with the page associated with the content publisher comprises providing an advertisement related to the selected selectable descriptor in a second hypertext markup language (HTML) inline frame embedded in the page associated with the content publisher.

8. A system, comprising:
one or more computers, including:
non-transitory computer-readable medium coupled to a processor, the medium programmed with computer executable code which, when executed, performs the actions of:
receiving a request for an advertisement presentation to be displayed with a first content page of a content-related site that is hosted by the content publisher;
providing the requested advertisement presentation for display with the content associated with the first content page, the advertisement presentation including at least one advertisement and a link to a landing page associated with a sponsor of the advertisement, and a selectable descriptor that is indicative of a category to which at least a portion of the content-related site belongs, the selectable descriptor including a different, second link to a page associated with the content publisher that, in response to user interaction with the selectable descriptor, causes the user device to request presentation of the page associated with the content publisher; and
in response to receiving data indicative of a user interaction with the selectable descriptor, providing an advertisement presentation with the page associated with the content publisher.

9. A system comprising:
one or more computers, including:
memory coupled to a processor, the memory programmed with computer executable code which, when executed, performs the actions of:
receive receiving a request for an advertisement presentation to be displayed with a first content page of a content-related site that is hosted by the content publisher, the advertisement presentation including at least one advertisement and a link to a landing page associated with a sponsor of the advertisement, and a selectable descriptor that is indicative of a category to which at least a portion of the content-related site belongs, the selectable descriptor including a different, second link to a page associated with the content publisher that, in response to user interaction with the selectable descriptor, causes the user device to request presentation of a the page associated with the content publisher;
providing the requested advertisement presentation for display with the first content page a content-related site hosted by the content publisher; and
in response to receiving data indicative of a user interaction with the selectable descriptor in the advertisement presentation, providing an advertisement presentation with the page associated with the content publisher.

10. The system of claim 9, wherein a location of the page associated with the content publisher is included in the received customization settings.

11. The system of claim 10, wherein providing the requested advertisement presentation comprises providing the selectable descriptor in a first hypertext markup language (HTML) inline frame embedded in the content-related site.

12. The system of claim 11, wherein the user selection comprises a selection of the selectable descriptor, and wherein the advertising management module provides the advertisement presentation with the page associated with the content publisher by rendering an advertisement related to the selected descriptor in a second hypertext markup language (HTML) inline frame embedded in the page associated with the content publisher.

13. The system of claim 9, wherein the advertisement presentation for the page associated with the content publisher is selected based, at least in part, on content of the selectable descriptor, the advertisement presentation including a link to an advertisement landing page that is hosted by an advertiser.

14. The system of claim 9, further comprising:
receiving customization settings from the content publisher, the customization settings controlling a manner in which information is displayed at a user device; and
customizing the advertisement presentation with the page associated with the content publisher based on the received customization settings.

15. The system of claim 14, wherein the customization settings comprise parameters associated with a color scheme.

16. A non-transitory computer readable medium storing a computer program, the computer program including instructions that, when executed, cause at least one processor to:

receive a request for an advertisement presentation to be displayed with a first content page of a content-related site that is hosted by the content publisher;

provide the requested advertisement presentation for display with the first content page, the advertisement presentation including at least one advertisement and a link to a landing page associated with a sponsor of the advertisement, and a selectable descriptor that is indicative of a category to which at least a portion of the content-related site belongs, the selectable descriptor including a different, second link to a page associated with the content publisher that, in response to user interaction with the selectable descriptor, causes the user device to request presentation of a the page associated with the content publisher; and in response to receiving data indicative of a user interaction with the selectable descriptor, provide an advertisement presentation with the page associated with the content publisher.

* * * * *